R. E. BATES.
MOTOR ATTACHMENT FOR BICYCLES.
APPLICATION FILED DEC. 30, 1916.
1,364,476. Patented Jan. 4, 1921.
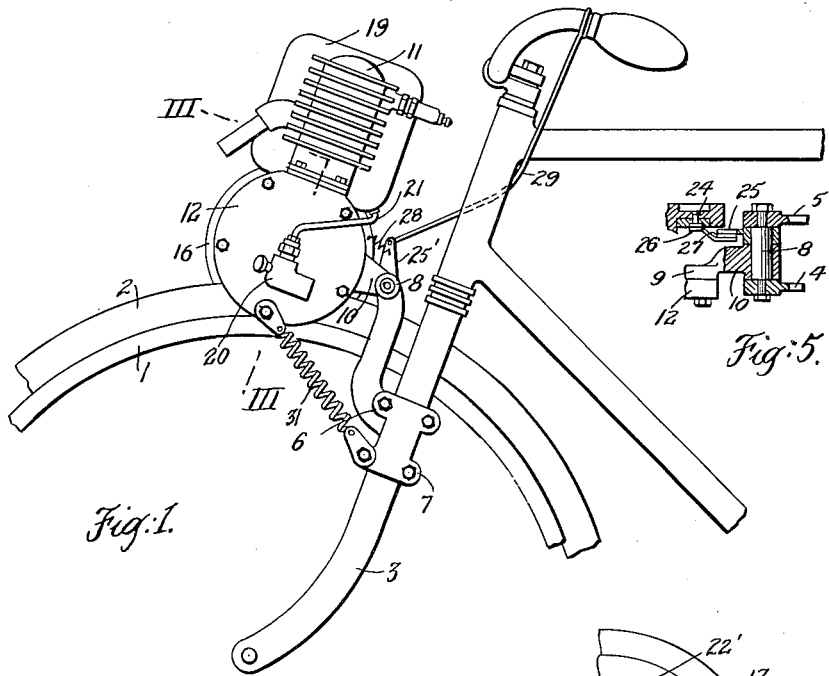
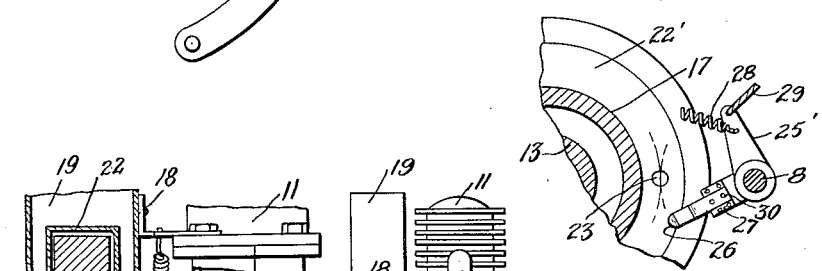
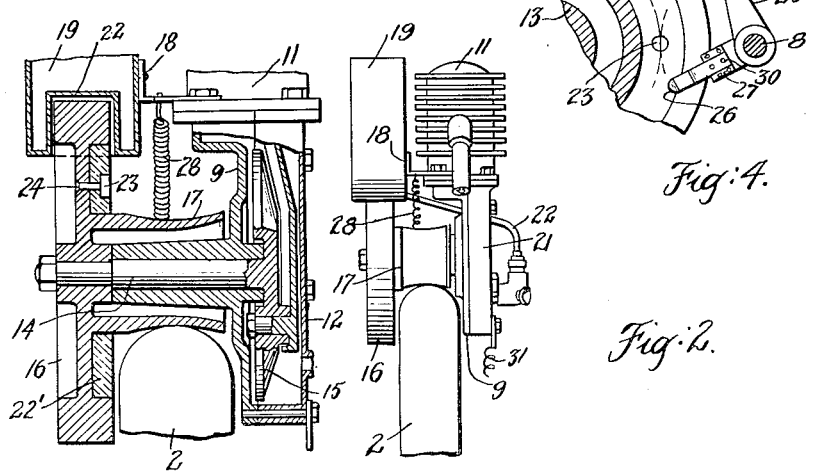
Inventor
Ralph E. Bates
By his Attorney
Charles H. Wilson

UNITED STATES PATENT OFFICE.

RALPH E. BATES, OF BROOKLYN, NEW YORK, ASSIGNOR TO OKAY MOTOR MANUFACTURING COMPANY, INC., OF BROOKLYN, NEW YORK, A CORPORATION OF NEW YORK.

MOTOR ATTACHMENT FOR BICYCLES.

1,364,476.      Specification of Letters Patent.      Patented Jan. 4, 1921.

Application filed December 30, 1916. Serial No. 139,947.

*To all whom it may concern:*

Be it known that I, RALPH E. BATES, a citizen of the United States, residing at Brooklyn, in the county of Kings and State of New York, have invented certain new and useful Improvements in Motor Attachments for Bicycles, of which the following is a specification.

This invention relates to a motor attachment for vehicles, and particularly to a motor adapted to be attached to a bicycle or the like.

The particular object of the invention is to provide an economical and effective device as indicated by means of which an ordinary bicycle may be converted into a self-propelled bicycle without necessity for any cutting or fitting, such as would require the services of a skilled mechanic.

A more detailed object is to provide a motor with means whereby it may be attached in such position as to engage and drive directly upon the tire of the front wheel of a bicycle, together with control means adapted to be operated from the handle bars of the bicycle.

A further detailed object is to provide a motor which is adapted to be supported at the upper side of the wheel tire, and to so arrange the parts of the motor that the motor will be properly and evenly balanced upon the relatively narrow surface presented at the upper side of the wheel so as to avoid undue strain upon any part of the mechanism.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown a merely preferred form of embodiment of the invention:

Figure 1 is a side elevational view of the forward portion of a bicycle illustrating a motor attached thereto in accordance with the provisions of this invention.

Fig. 2 is a front elevational view of a portion of the structure shown in Fig. 1.

Fig. 3 is an enlarged sectional view taken upon the plane of line III—III of Fig. 1.

Fig. 4 is a similarly enlarged fragmentary detail view illustrating the electrical contact parts for regulating the speed of the motor; and Fig. 5 is a detail sectional view taken upon the plane of line V—V of Fig. 4.

Referring to the drawings for a detailed description of the structure which is illustrated therein, the reference character 1 indicates the front wheel of the bicycle, carrying the usual tire 2. The front forks of the bicycle are indicated at 3.

A pair of brackets 4 and 5 are fixed one to each of the opposite forks 3 in any suitable manner, for instance by means of the clamp plates 6 and bolts 7.

A connecting bolt 8 extends between the upper ends of the brackets 4 and 5 just above the upper surface of the tire 2 and said bolt constitutes a bearing shaft between the brackets 4 and 5 for pivotal engagement by a part of the motor.

The motor comprises a crank case 9 which is provided with a rearwardly extending arm 10 which is apertured for engaging the shaft 8, as clearly seen in Fig. 5.

The reference numeral 11 indicates the motor cylinder.

The reference numeral 12 indicates a removable cover for the crank case.

The crank case is arranged at one side of the wheel tire, as clearly seen in Figs. 2 and 3, and is provided with an elongated bearing 13 which extends over above the upper side of the tire and carries the crank shaft 14. A crank disk 15 is fixed to the shaft within the crank casing and a flywheel 16 is fixed to the outer end of the shaft occupying a position corresponding with the position of the crank case but at the opposite side of the wheel tire from that occupied by the crank case.

The flywheel is provided with a sleeve 17 which projects therefrom toward the crank case, said sleeve being disposed to surround the bearing 13 and being preferably made slightly concave for the purpose of engaging and centering upon the upper surface of the tire.

The sleeve 17 constitutes a traction roll so that when the motor is running said roll will drive the bicycle wheel by frictional engagement with the tire.

Attached to the cylinder 11, as by means of brackets 18, is a fuel tank 19. A carbureter device 20 is connected with the tank 19 by means of a pipe 21.

The tank is preferably provided with a recess 22 conforming to the shape of the upper portion of the flywheel so that the tank may be telescoped somewhat downwardly over the flywheel for the sake of compactness of structure.

The motor may be of any approved type but preferably is of the two-cycle type having a jump-spark ignition system.

The jump spark ignition system is so generally well known that only the primary controlling element, which forms a part of this invention, will be described. This element consists of means for opening and closing the primary circuit grounded through the motor frame, the secondary circuit taking effect at the spark plug in the cylinder to ignite the gas. The means illustrated for controlling the primary circuit, is as follows: The flywheel 16 is provided with an insulating ring 22′, preferably received in an annular groove formed in the flywheel. A contact button 23 is embedded in the insulation, one end being electrically connected with the material of the flywheel, as at 24. The button may serve as means for retaining the insulation in position, if desired. A bell-crank 25, having a contact arm 26, is pivotally mounted upon the shaft 8, the contact arm 26 being insulated from the shaft by means of a block of insulation 27.

In Fig. 4 of the drawings, the contact arm 26 is illustrated in "off" position, resting upon the surface of the insulation 22′. When it is moved to "on" position it comes into the path of movement of the button 23. As the flywheel rotates the engagement of the button with the contact member 26 causes the circuit to be closed and opened, thereby generating the secondary current.

The primary wire is attached to the contact arm 26 by means of a binding-screw 30.

A spring 28 is arranged for engaging the second arm, as 25′, of the bell-crank to normally urge the contact arm 26 into "off" position. A controlling cord 29 extends from the arm 25′ preferably to the handle bar of the bicycle for moving the bell-crank against the tension of the spring.

It is obvious that the time of the ignition, and consequently the speed of the motor, may be altered by swinging the contact arm 26 to a higher or lower position.

In case the force of gravity is insufficient for producing the desired friction grip of the sleeve 17 upon the wheel tire, a tension spring 31 may be employed to extend between the crank casing and one of the clamps on the bicycle forks for urging the crank casing downwardly with more or less pressure according to the tension of the spring.

By arranging the crank case and cylinder at one side of the vertical plane of the bicycle tire and the flywheel and fuel tank at the opposite side, it is apparent that the weight is approximately evenly divided with respect to the tire so that strains upon the parts connecting the motor with the bicycle frame, and indirectly upon the bicycle frame, are avoided. The elements at opposite sides of the bicycle wheel may be so proportioned and arranged as to produce almost an absolute balance, if desired. In this connection attention is directed to the fact that the crank disk 15 coöperates with the flywheel 16 to produce the desired usual momentum effect upon the motor and that the crank disk and flywheel may be enlarged or reduced with respect to each other as required for producing the desired balance effect without in any way effecting the momentum producing action of the flywheel.

Having thus described my invention what I claim as new and desire to secure by Letters Patent is:

1. A motor for vehicles or the like, comprising an engine cylinder, a crank casing, and a flywheel, the flywheel being spaced from the crank casing, and traction means interposed between the flywheel and the crank casing and integrally formed upon said flywheel for directly engaging a portion of the vehicle wheel to drive said wheel.

2. A motor for vehicles or the like, comprising an engine cylinder, a crank casing, and a flywheel, the flywheel being spaced from the crank casing, and a sleeve carried by the flywheel projecting into the space between the flywheel and the crank casing for directly engaging a portion of the vehicle wheel to drive said wheel.

3. A motor device, comprising an engine cylinder, a crank casing, and a flywheel, the flywheel being spaced away from the crank casing, and a sleeve carried by the flywheel projecting into the space between the flywheel and the crank casing adapted to serve as a drive pulley.

4. A motor for vehicles or the like, comprising an engine cylinder, a crank casing, and a flywheel, the flywheel being spaced from the crank casing to provide a space for receiving a portion of the vehicle wheel, parts extending between the crank casing and the flywheel for engaging the wheel for supporting the motor upon the wheel, and means carried within the crank casing coöperating with the flywheel to produce a balance of the motor upon the vehicle wheel.

5. A motor for vehicles or the like, comprising an engine cylinder, a crank casing, and a flywheel, the motor having a portion intermediate its length for engaging the vehicle wheel to support the motor, said portion comprising a sleeve fixed to the flywheel to rotate therewith for constituting traction means to drive the wheel, and the parts of the motor at opposite sides of said mentioned intermediate part being of substantially equal weight, for the purpose described.

6. A motor device, comprising an engine cylinder, a crank casing, and a flywheel, said device having a portion intermediate its length adapted to serve as means for engaging a support to support the device, the engine cylinder and crank casing being arranged at one side of said intermediate portion and the flywheel being arranged at the opposite side of said intermediate portion, and the parts at the opposite sides of said intermediate portion being of substantially equal weight whereby the device may be substantially balanced upon the support.

In testimony whereof I affix my signature in the presence of two witnesses.

RALPH E. BATES.

Witnesses:
EMMA WEINBERG,
LOUIS BRANDWEIN.